United States Patent
Kotila (10) Patent No.: US 11,113,807 B2
(45) Date of Patent: Sep. 7, 2021

(54) METHOD OF DETECTING PROCESS IRREGULARITIES BY MEANS OF VOLUME IMAGE DATA OF THE MANUFACTURED OBJECT

(71) Applicant: EOS GmbH Electro Optical Systems, Krailling (DE)

(72) Inventor: Juha Kotila, Turku (FI)

(73) Assignee: EOS GmbH Electro Optical Systems, Krailling (DE)

( * ) Notice: Subject to any disclaimer, the term of this patent is extended or adjusted under 35 U.S.C. 154(b) by 58 days.

(21) Appl. No.: 16/467,131

(22) PCT Filed: Jan. 12, 2017

(86) PCT No.: PCT/EP2017/050542
§ 371 (c)(1),
(2) Date: Jun. 6, 2019

(87) PCT Pub. No.: WO2018/130283
PCT Pub. Date: Jul. 19, 2018

(65) Prior Publication Data
US 2020/0074609 A1    Mar. 5, 2020

(51) Int. Cl.
*G06T 7/00* (2017.01)
*B33Y 50/00* (2015.01)
(Continued)

(52) U.S. Cl.
CPC ............ *G06T 7/001* (2013.01); *B22F 10/20* (2021.01); *B33Y 50/00* (2014.12); *B22F 10/30* (2021.01);
(Continued)

(58) Field of Classification Search
CPC combination set(s) only.
See application file for complete search history.

(56) References Cited

U.S. PATENT DOCUMENTS 5,621,811 A * 4/1997 Roder ................. G01R 31/302
                                                      382/147
5,815,198 A * 9/1998 Vachtsevanos ........ G01N 21/88
                                                      348/125
(Continued)

FOREIGN PATENT DOCUMENTS

EP          1486317        12/2004
WO          9511100        4/1995

OTHER PUBLICATIONS

PCT International Search Report for Application No. PCT/EP2017/050542 dated Jan. 12, 2017, 3 pages.
(Continued)

*Primary Examiner* — Tsung Yin Tsai
(74) *Attorney, Agent, or Firm* — Seyfarth Shaw LLP (57) ABSTRACT

A method of training a detection system is able to acquire volume image data in an additively manufactured object for the detection of process irregularities, and comprises the steps of: a) receiving process irregularity data referring to a selected location within an additively manufactured reference object in which selected location a predefined process irregularity occurred during the additive manufacture of the object, b) acquiring volume image data of a volume of the reference object comprising at least the selected location by said detection system, c) identifying within the volume image data characteristic data which represent a difference between the volume image data of the selected location in comparison with the volume image data of at least one other location of the reference object and/or of a number of other additively manufactured objects in which no process irregularity has occurred and/or no process irregularity is suspected, d) assigning to the predefined process irregularity the characteristic data as a representative of the predefined process irregularity.

16 Claims, 4 Drawing Sheets

(51) Int. Cl.
 *B22F 10/20* (2021.01)
 *B22F 10/30* (2021.01)
(52) U.S. Cl.
 CPC .............. *G06T 2207/10081* (2013.01); *G06T 2207/20081* (2013.01)

(56) References Cited

U.S. PATENT DOCUMENTS

| | | | | |
|---|---|---|---|---|
| 6,246,787 | B1* | 6/2001 | Hennessey | G01N 21/95607 |
| | | | | 250/559.45 |
| 2007/0217672 | A1* | 9/2007 | Shannon | G06K 9/00 |
| | | | | 382/152 |
| 2009/0152771 | A1* | 6/2009 | Philippi | B33Y 10/00 |
| | | | | 264/410 |
| 2009/0273669 | A1* | 11/2009 | Wertsman | G06T 7/0004 |
| | | | | 348/87 |
| 2011/0182495 | A1* | 7/2011 | Sun | G06T 7/48 |
| | | | | 382/141 |
| 2012/0310576 | A1* | 12/2012 | Rose | G01N 29/30 |
| | | | | 702/83 |
| 2016/0202691 | A1 | 7/2016 | Pettersson et al. | |
| 2016/0368220 | A1 | 12/2016 | DiMatteo et al. | |
| 2017/0368753 | A1* | 12/2017 | Yang | G05B 19/4099 |
| 2018/0322623 | A1* | 11/2018 | Memo | G06N 3/084 |
| 2018/0341248 | A1* | 11/2018 | Mehr | G05B 13/048 |
| 2019/0303717 | A1* | 10/2019 | Bhaskar | G06T 7/0004 |

OTHER PUBLICATIONS

DeChiffre L. et al: "Industrial applications of computed tomography," CIRP Annals, vol. 63, No. 2, pp. 655-677, doi; 10.1016/J.CIRP, May 11, 2014, 23 pages.

* cited by examiner

METHOD OF DETECTING PROCESS IRREGULARITIES BY MEANS OF VOLUME IMAGE DATA OF THE MANUFACTURED OBJECT

TECHNICAL FIELD OF THE INVENTION

The present invention is directed to a method of detecting process irregularities that have occurred in an additive manufacturing process of an object, wherein based on an analysis of volume image data of the object such process irregularities are detected.

BACKGROUND OF THE INVENTION

In general, an additive manufacturing method is a method of generating objects by adding material. Usually the objects are generated layer-wise in a sequential process with each layer corresponding to a cross-section of the object to be generated. The details of e.g. a laser sintering method are described in WO 95/11100 A1. Whereas in laser sintering or melting the building material is melted by introducing heat energy by means of radiation, in a three-dimensional printing process powder particles are combined with one another by means of a glue that is selectively applied onto positions within a powder layer that correspond to a cross-section of an object to be manufactured.

When there is no careful control of the process parameters during the manufacture, unintended irregularities may occur during the manufacturing process. For instance, in a manufacturing process, in which a building material is solidified by supplying heat energy by means of radiation, a local over-heating may occur that leads to inferior mechanical properties at that location within the manufactured object at which the over-heating of the building material occurred. Further, when re-using building material (using in the building process material from a previous manufacturing process that was not solidified in the previous manufacturing process), there may result areas at the surface of a manufactured object that show an increased, undesired surface roughness.

Usually, when trying to evaluate the quality of the manufactured parts, in particular the mechanical properties, one has to perform tests with the manufactured objects that may lead to a destruction of the tested objects. In particular, when the manufactured parts are large and/or expensive, such destructive tests are undesirable. Though EP 1 486 317 B1 suggests doing the destructive tests on dedicated test parts, unintended process irregularities that occurred within the actual parts to be produced, cannot be detected by such an approach.

One might use a non-destructive inspection device for capturing volume image data of objects, e.g. a computer tomography (CT) device using X-rays for gaining information also on the inner regions of a manufactured object. However, the images provided by such a device often are difficult to understand. In particular, it is not known, which conclusion with regard to the manufacturing parameters have to be drawn based on these images.

SUMMARY OF THE INVENTION

As a result, the object of the present invention is to provide a method of detecting a particular process irregularity in an additively manufactured object by a non-destructive test. The object is achieved by a training method according to claim 1, a method according to claims 8 and 12, a training data provision device according to claim 13, an irregularity data provision device according to claim 14 and a system according to claim 15. Here, features in the dependent claims and in the description below that are mentioned with respect to a method may also be provided in the devices and vice versa. Furthermore, features mentioned in relation to a particular device and/or method may also be applied to other devices and/or methods.

An inventive method of training a detection system that is able to acquire volume image data in an additively manufactured object for the detection of process irregularities, comprises the steps of:

a) receiving process irregularity data referring to a selected location within an additively manufactured reference object in which selected location a predefined process irregularity occurred during the additive manufacture of the object, b) acquiring volume image data of a volume of the reference object comprising at least the selected location by said detection system, c) identifying within the volume image data characteristic data which represent a difference between the volume image data of the selected location in comparison with the volume image data of at least one other location of the reference object and/or of a number of other additively manufactured objects in which no process irregularity has occurred and/or no process irregularity is suspected, and d) assigning to the predefined process irregularity the characteristic data as a representative of the predefined process irregularity.

According to the invention a detection system, in particular one that is able to gather volume image data of an additively manufactured object, is adjusted (trained) such as to provide information on particular process irregularities that occurred during the manufacturing of an object. In order to do so, a reference object is manufactured by an additive manufacturing method, wherein at predefined (selected) locations within the reference object the process parameters of the manufacturing process are adjusted such as to deliberately cause pre-defined process irregularities at the selected locations (e.g. by supplying too much heat energy to the building material).

After a reference object with induced defects resulting from the process irregularities has been manufactured, such reference object is examined by means of the detection system. In such examination step at least the selected locations of the reference object, where process irregularities were induced, are examined by gathering volume image data. Here, a selected location is a (mostly small) region within the reference object and the volume image data of such a region may comprise one or more three-dimensional pixels (voxels). In order to detect data characteristics to a predefined process irregularity that occurred at a selected location, the volume image data of the selected location are compared to volume image data at at least one other location of the reference object at which no process irregularity was induced and/or to volume image data of locations in other objects that were manufactured by the same manufacturing process. Of course, when making the comparison one has to make sure that no unintended process irregularity occurred at the locations at which process irregularities were not deliberately induced. The detected differences than are assigned to the predefined process irregularity that had been induced as characteristic data representative of the predefined process irregularity.

According to the inventive method it becomes possible to gain information on process irregularities that occurred during an additive manufacturing process of an object by means of a detection system that is able to provide volume image data of an object in a non-destructive way. In particular, it becomes even possible to gain information on mechanical defects provoked by process irregularities merely based on volume image data.

Preferably, the method comprises the following steps prior to step a):
defining the selected location within the reference object prior to or during additive manufacture of the reference object,
causing the predefined process irregularity during the additive manufacture of the reference object in the selected location, and
(preferably after the additive manufacture), storing the characteristic data in a memory.

According to the preferred variation of the inventive method a location within the reference object is selected, at which a process irregularity shall be deliberately caused. In addition, it may also happen during the additive manufacturing of the reference object that (e.g. based on information from a process monitoring device) one notices that an unintended process irregularity occurred. In such case the location within the reference object, where such unintended process irregularity occurred is also defined to be a selected location.

When causing the predefined process irregularity, it is particularly important to define the region in space within the reference object that may be affected by the process irregularity. Thus, the size and shape of the selected location of a process irregularity are important. Furthermore, according to the preferred variation process irregularity data are stored in a memory in order to be accessible later for assigning such process irregularity information to the characteristic data representative of a process irregularity. Process irregularity data may e.g. comprise the values of one or more process parameters that were deliberately chosen in order to induce a process irregularity. Moreover, it is possible to define classes (types) of process irregularities and to store in particular the specific class (type) to which a process irregularity belongs in the memory.

Further preferably, the predefined process irregularity is a process irregularity deliberately caused during the additive manufacture of the reference object.

Though, of course, it is possible to take into account process irregularities that unintendedly occurred during the manufacturing of a reference object, according to the present invention it is preferred to deliberately induce process irregularities during the manufacturing of the reference object. In particular, when deliberately inducing process irregularities, one has full control on the kind (type) of process irregularity that occurred, which is not the case when based on monitoring data during the manufacturing it is inferred to a particular kind of process irregularity. In other words, the deliberately induced process irregularity is reproducible.

Further preferably, the predefined process irregularity is a process irregularity with essentially known irregularity factors referring to selected effects of an additive manufacturing environment on the additive manufacturing process.

Here, the term "irregularity factor" refers to causes for the occurrence of process irregularities, e.g. parameters of the manufacturing process that have an influence on the quality of the reference object (such as process parameters like e.g. a laser beam deflection velocity or a powder bed temperature).

In particular, the essentially known irregularity factors may comprise at least one of:

a change of process parameters compared to those used elsewhere within the reference object during additive manufacture and
a change of manufacturing material properties compared to that used elsewhere within the reference object during additive manufacture. For instance, a change of manufacturing material may be to mix a matrix material (i.e. a first material which has been used before in the additive manufacturing process) with an additional material, preferably with a higher melting point, in particular with a substantially higher melting point than the matrix material—such as essentially pure W and/or Al2O3 (of known particle size).

The irregularity factors may not only comprise process parameters linked to particular parameters of the additive manufacturing process and device, respectively. Rather, the irregularity factors may also comprise material properties that change during the manufacturing of the reference object, resulting in defects or at least changing properties within the reference object.

In particular, the process parameters may include the laser power, the exposure strategy of a building material layer (e.g. exposure in stripes), the laser focus size, parameters of an inert gas atmosphere such as type of gas or gas flow, the process temperature, the applied layer thickness and even the quality of an applied powder layer (e.g. taking into account locally missing material (gaps)).

The material properties may include the grain size or grain size distribution of a building material in powder form, the age of the powder (in particular, the proportion of re-used powder mixed with virgin—previously unused—powder), the amount of oxidation of the material during the manufacturing process or damages to the material (e.g. material that is inhomogeneously contaminated with other types of material or foreign bodies, etc.).

Preferably, the volume image data in step c) are taken by means of a tomographic imaging system, preferably a CT inspection system.

Though the inventive method is applicable to various detection systems able to gather volume image data, preferably, the method is applied to tomographic imaging systems that are able to provide a voxel-based image information of a reference object. In particular, the method is preferably applied to a computer tomography inspection system, which is more and more used e.g. for inspecting metal bodies.

The additive manufacture may comprise a powder-based manufacturing method, in particular selective laser sintering or selective laser melting or electron beam melting.

As in a powder-based manufacturing method, in particular in Selective Laser Sintering (SLS) or Selective Laser Melting (SLM) or EBM (electron beam melting), in particular metal materials can be used as building materials, the inventive method is preferably applied to such manufacturing methods.

An inventive method of detecting a particular process irregularity in an additively manufactured object, comprises the steps of:
x) acquiring volume image data of a volume of the object,
y) comparing the volume image data with a number of characteristic data each referring to a selected process irregularity (which may comprise both a specific process irregularity a process irregularity class/type which comprises several process irregularity types—this definition used throughout this application unless stated otherwise), the characteristic data having been derived in an inventive training method, and z) outputting an information referring to the particular process irregularity in a finding location in the object if the volume image data in that finding location match the characteristic data of that particular process irregularity.

After a detection system has been trained such as to be able to identify process irregularities by volume image data that are characteristic data for a process irregularity, it is possible to use such a system for detecting process irregularities that possibly occurred in an additive manufacturing process of a real object. In order to do so, by the detection system volume image data of a volume of the manufactured real object are gathered. These volume image data are compared to a number of characteristic volume image data each of which refers to a particular (type of) process irregularity. In case a coincidence (or at least similarity) with characteristic data is found for a particular volume element, the occurrence of the related process irregularity is assigned to the respective location ("finding location") of the volume element in the real object. Thereby, process irregularity information can be gathered about an object without (probably destructive) mechanical tests.

Preferably, the volume image data taken in step x) are taken by essentially the same imaging method, preferably by essentially the same type of imaging device, as the volume image data taken in step b).

The best correlation between process irregularity information and volume image data provided by a detection system is obtained when the reference object(s) based on which the characteristic data of a process irregularity were obtained were examined by the same imaging method used in the actual manufacturing process to be assessed. As the results obtained by an imaging method may even vary from imaging device to imaging device, preferably the reference object and the corresponding characteristic data obtained therewith should have been obtained by the same (type of) imaging device used to examine the actual object for defects caused by process irregularities.

Preferably, the additively manufactured object has been manufactured by the same additive manufacturing method used for manufacturing the reference object, preferably has been manufactured with the same type of additive manufacturing device used for manufacturing the reference object.

Process irregularities often are specific for a certain kind of additive manufacturing method. Accordingly, the information from a detection device that captures volume images of a manufactured object may be more precise, if the characteristic data for process irregularities have been obtained by the same type of additive manufacturing device that is used in the manufacturing process of an actual object to be assessed.

Even more preferably, the additively manufactured object has been manufactured with the same additive manufacturing device used for manufacturing the reference object As the effect of process irregularities may be very sensitive for slight changes of the additive manufacturing environment, the most precise results may be obtained for a case, in which the same additive manufacturing device is used for manufacturing the reference object and the actual object to be assessed.

An inventive method of providing process irregularity data for an inventive training method and/or an inventive detection method comprises the steps of:
  defining the selected location within the reference object prior to or during additive manufacture of the reference object,
  causing the predefined process irregularity during the additive manufacture of the reference object in the selected location,
  (preferably after the additive manufacture) providing the process irregularity data to a memory.

By means of this method, reference objects with known locations of defects resulting from process irregularities are provided. Such reference objects are necessary for training a detection device capturing volume image data.

An inventive training data provision device comprises a number of characteristic data derived from a an inventive training method Such a training data provision device may provide a database comprising volume image data of a particular detection device, wherein the data are assigned to process irregularities that may occur in an additive manufacturing method.

An inventive irregularity data provision device comprises a number of process irregularity data derived from an inventive method of providing process irregularity data.

Such an irregularity data provision device may provide a database based on which a detection system can be trained to identify particular process irregularities on the basis of volume image data collected by the detection system.

An inventive system for detecting a particular process irregularity in an additively manufactured object comprises:
x) a detection system for acquiring volume image data of a volume of the object,
y) a comparison unit which in operation compares the volume image data with a number of characteristic data each referring to a selected process irregularity, the characteristic data having been derived in an inventive training method,
z) an output unit for outputting an information referring to the particular process irregularity in a finding location of the object if the volume image data in that finding location match the characteristic data of that particular process irregularity.

By such a system it is possible to automatically detect particular process irregularities that occurred during the manufacturing of an object. Accordingly, after objects have been manufactured by an actual manufacturing process, it is possible to assign defects created by process irregularities to locations within the manufactured objects merely based on a detection system that in a non-destructive way gathers volume image data of the objects.

BRIEF DESCRIPTION OF THE DRAWINGS

In the following, the invention is described by means of the drawings, of which.

DETAILED DESCRIPTION OF THE EMBODIMENTS

Figure 1:
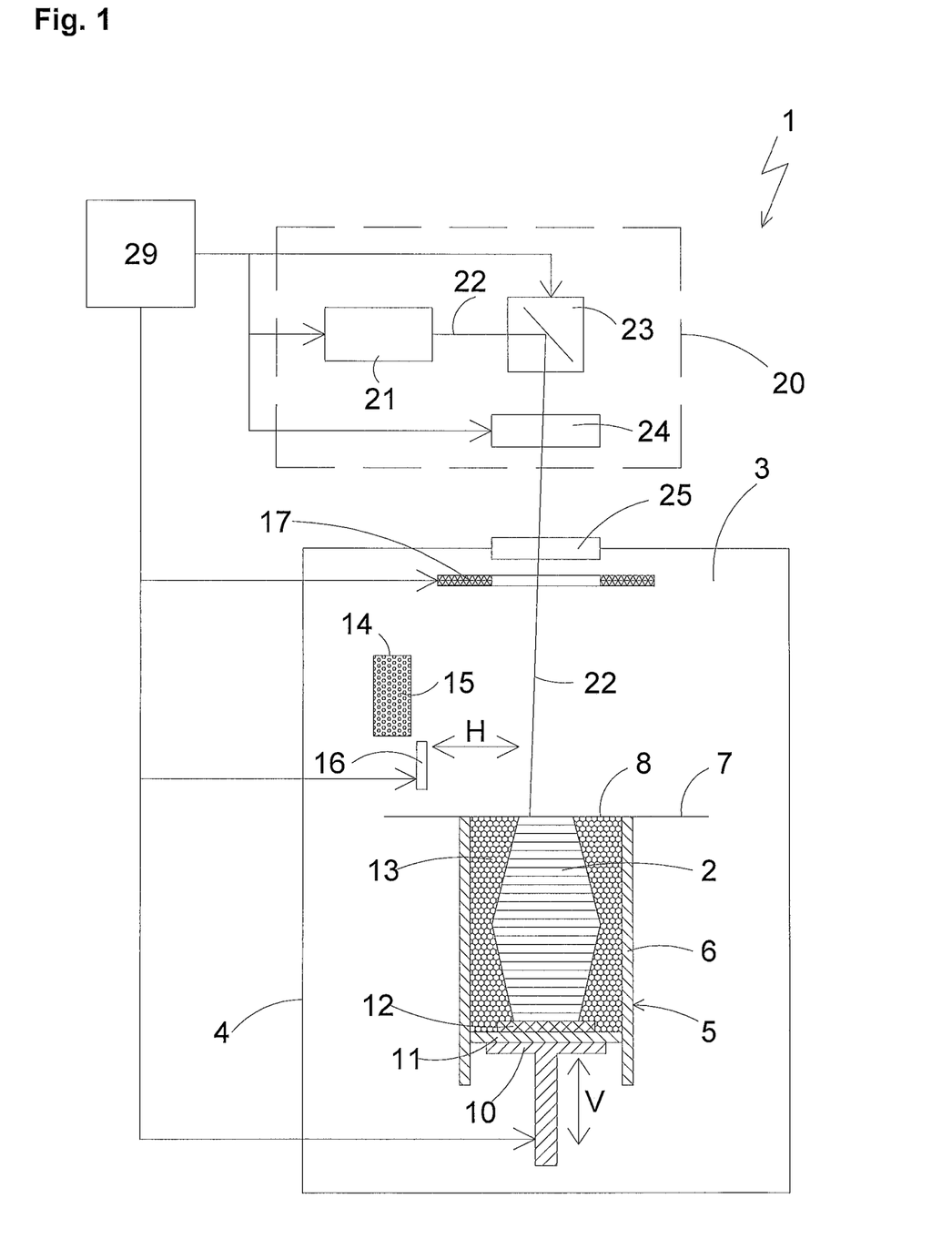
FIG. 1 shows an example of a device for a layer-wise manufacturing of three-dimensional objects from a building material in powder form.

For a description of the invention at first the course of an additive manufacturing method shall be described by way of the example of a laser sintering or melting device as schematically shown in FIG. 1.

In such a laser sintering or melting device 1 one or more objects 2 (only one is shown) are manufactured in a process chamber 3 having a chamber wall 4. A container 5 open to the top is arranged in the process chamber 3, wherein the container 5 has a container wall 6. The opening of the container 5 at its top defines a working plane 7 wherein that part of the working plane 7 that lies inside of the container 5 is defined as construction field 8.

A support 10 that can be moved in a vertical direction V is arranged in the container 5, wherein a baseplate 11 is attached to the support 10 and serves as bottom of the container 5. The baseplate 11 may also be formed integrally with the support 10. Optionally a building platform 12 may be arranged on the baseplate 11. In FIG. 1 the object 2 to be manufactured is shown in an intermediate state with several solidified layers surrounded by unsolidified building material 13.

Building material 15 in powder form in a supply container 14 is applied within the construction field 8 by means of an application device 16 that can be moved in a horizontal direction H. FIG. 1 also shows an optional radiative heater 17 for heating the building material within the construction field 8 up to a process temperature.

In FIG. 1 an exposure device 20 is arranged above the process chamber 3. The exposure device 20 comprises a laser 21 that generates a laser beam 22, which is deflected by a deflection device 23 such that it enters the process chamber 3 through a window 25. Furthermore, the exposure device 20 comprises a focussing device 24 that focuses the laser beam 22 onto the working plane 7.

Finally, the laser sintering device 1 comprises a control unit 29 for controlling its individual parts such as the exposure device 20, the application device 16 and the support 10. The control unit 29 operates in accordance with a control program, which e.g. contains data of the objects to be manufactured such as a three-dimensional layer model with information on the positions within a layer that are to be irradiated with the laser beam for solidifying the building material there. Furthermore, the control program also may specify other process parameters for operating the laser sintering device such as the process temperature, the thickness of applied layers, the irradiation parameters, etc.

When manufacturing objects with the exemplary laser sintering device 1, in accordance with the control program the support 10 is lowered by an amount of one layer thickness, a layer of unsolidified powder material 14 is applied within the construction field 8 by means of the application device 16 and is irradiated by means of the exposure device 20 at those positions in the layer that correspond to a cross-section of the one or more objects 2 to be manufactured. Such steps are repeated until the object(s) is completed.

It shall be mentioned that the present invention is applicable not only to laser sintering or melting, but to any additive manufacturing method such as stereolithography, selective mask sintering (SMS), layer laminate manufacturing (LLM), fused layer modeling (FLM), 3D printing, direct metal deposition (DMD), etc. Furthermore, in an additive manufacturing device also other irradiation devices than the above-mentioned exposure device 20 may be used, such as an electron beam irradiation device, a laser array device, an ultraviolet light emitting device, etc. Finally, the above described structure of the laser sintering or melting device is just an example and may be modified within the scope of the present invention.

The building material used in the additive manufacturing method may be a metal powder or paste, a polymer powder or paste, a ceramic powder or paste, a liquid photo-hardenable polymer, etc.

Figure 5:
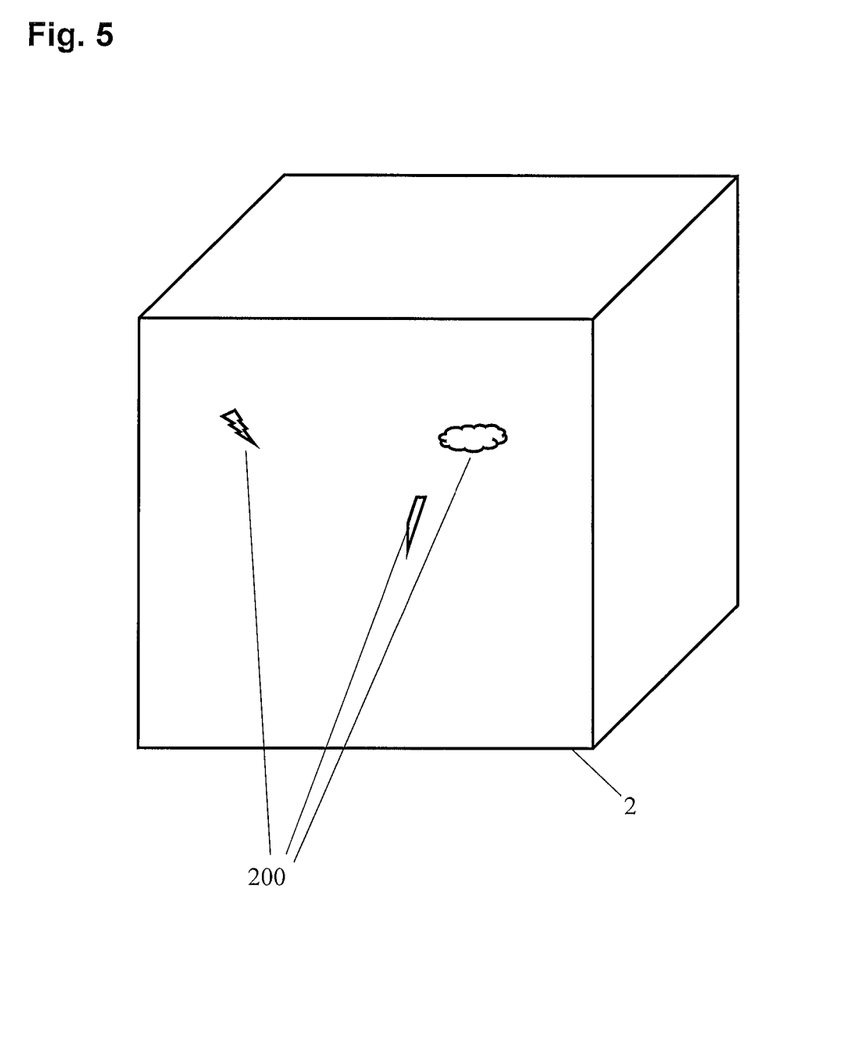

In the following, an exemplary embodiment of the invention is described. In this exemplary embodiment, a part is manufactured by means of a laser sintering or laser melting device and is inspected by means of a CT system (an x-ray computed tomography system) as exemplary detection device. As is illustrated in FIG. 5, which schematically shows a CT image of an object 2 having defects 200, a defect 200 resulting from a particular process irregularity during the manufacture of an object 2 has a particular size and shape when it is detected by a CT system. As pointed out further above, different kinds of process irregularities may lead to different signatures in the CT image, such as different intensity, shape and size in the CT image, and therefore, based on a particular artefact in a CT image it is not easy to infer the corresponding causative process irregularity. However, according to the present invention, a method is presented, by which the CT system can be trained (taught) to assign a causative type of process irregularity to an artefact in a CT image of a manufactured object.

In order to train the CT system used for inspecting parts that have been manufactured in the additive manufacturing device (here a SLS or SLM device), at first a dummy part is manufactured by the additive manufacturing device, which dummy part may serve as reference object for training the CT detection system. When manufacturing such dummy part (reference object), locations in the reference object to be manufactured are selected, at which locations certain predefined types of process irregularities are deliberately generated in order to induce defects in the reference object at such predefined selected positions (locations) in said object.

A process irregularity at a certain position within the reference object may be generated e.g. by increasing or decreasing the laser power when the building material is irradiated at such position. Other exemplary strategies for generating process irregularities are a change of the diameter of the laser beam at the building material surface or a change of the deflection velocity with which the laser beam is swept over the selected location. Of course, there are various other possibilities of introducing process irregularities and the following list of examples is not meant to be exhaustive: For example, at the time a selected location is irradiated with the laser, the gas atmosphere, the gas flow or the process temperature may be changed. Furthermore, one may introduce defects into the applied layer at the selected location (e.g. an increased layer thickness at the location or missing building material at the selected location). Also, one might choose to apply building material with different properties at the selected location (e.g. powder material with a powder grain size (distribution) different from the usual powder grain size (distribution), a higher proportion of re-used building material, building material that has been oxidized to a certain degree, building material contaminated with foreign material or foreign bodies, etc.

Finally, data, in which process irregularities are linked to the locations in the object, at which they were induced (process irregularity data), are written into a memory. Such memory may be e.g. a mobile data carrier or a storage device in a computer network. It can be regarded as process irregularity data provision device that is used for training a particular process irregularity detection system. It shall be mentioned here that the process irregularity data may comprise a set of one or more process parameters (e.g. the laser power, the beam deflection velocity, etc.) from which not only the kind, but also the degree of the process irregularity can be derived.

After the manufacturing process of the reference object has been completed, the actual training method, which will be described in the following by referring to FIG. 2, may start.

Figure 2:
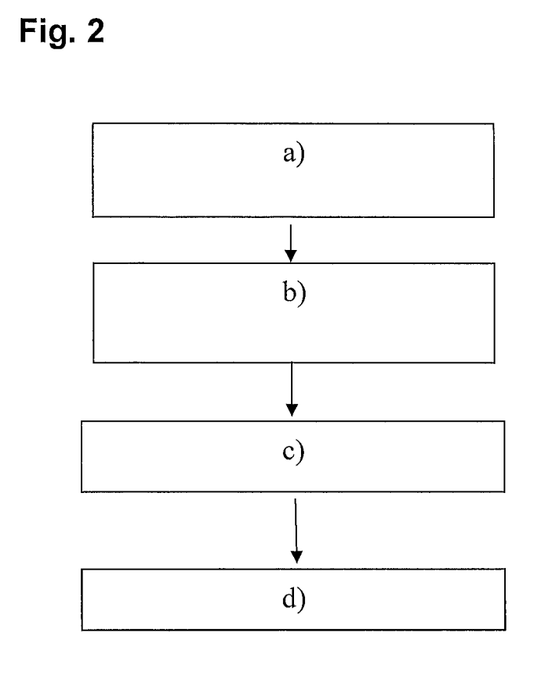
FIG. 2 shows a schematic block diagramme of the course of a method of training a detection system for the detection of process irregularities in an additively manufactured object according to an embodiment of the invention.

At first, process irregularity data for a reference object to be used have to be accessed (received) (step a) in FIG. 2).

Then (step b) in FIG. 2), volume image data of the reference object or at least of a part thereof are captured by the detection device to be trained (adjusted). In case of a CT system as detection device, a CT scan of the reference object or at least of portions thereof that include selected locations with process irregularities is made. The volume image data resulting from the CT scan may be stored in a memory for a later analysis thereof. Here, it may be mentioned that the invention is not limited to a particular data format of the volume image data.

Then (step c) in FIG. 2), for at least one, preferably all, selected location(s) the corresponding volume image data are analyzed in order to detect artefacts in volume image data that result from process irregularities. For example, the volume image data of a selected location may be compared to volume image data of one or more locations, at which no process irregularity was caused and it is also suspected that no process irregularity occurred inadvertently. Artefacts related to process irregularities may e.g. be detected by subtracting the volume image data those volume image data from regions at which no process irregularity occurred. When doing such comparisons, of course, one preferably compares volume image data of regions that are identical in size and shape. In order to be able to make meaningful comparisons, one might divide the volume captured by the detection device into unit volumes, wherein each selected location in the process irregularity data corresponds to a unit volume.

In a variation of the invention it is also possible to do a comparison not between different volume regions inside of the same reference object but to make a comparison with volume regions in other additively manufactured objects, which regions are unsuspicious with respect to defects therein. In case comparisons are made to a plurality of defect-free volume regions, either the mean of the volume image data can be taken for a comparison or the differences between volume image data at the selected location with respect to each the individual defect-free volume image data can be taken. How one proceeds here in detail is left up to the skilled person and does not limit the present invention.

After artefacts related to process irregularities have been detected in step c), volume image data (characteristic data) are assigned to each of the individual process irregularities that occurred in the reference object (step d) in FIG. 2). Here, it is also possible to assign characteristic data not to individual process irregularities, but to a particular type of process irregularity of a predefined set of possible process irregularity types.

As a result of the just-described process of assigning process irregularity data to volume image data of the CT system there exists a look-up table comprising volume image data that are characteristic for a particular (type of) process irregularity. Such look-up table may be regarded as training data provision device, which may be used in a method of detecting process irregularities by the corresponding detection device in an object that was additively manufactured e.g. by an SLS or SLM device.

A method and a system for detecting process irregularities in objects produced by an additive manufacturing method will be described in the following by making reference to FIGS. 3 and 4. The system 150 illustrated in FIG. 4 comprises an acquisition unit 51, which represents the detection system for collecting volume image data, e.g. a CT system. Such a data collection is the first method step x) shown in FIG. 3. As the case may be, taking volume image data a whole manufactured object by means of the acquisition unit may not be necessary. For example, in some cases the occurrence of process irregularities is expected only in a portion of the object, e.g. based on information from a process monitoring device such as a meltpool monitoring unit.

Figure 3:
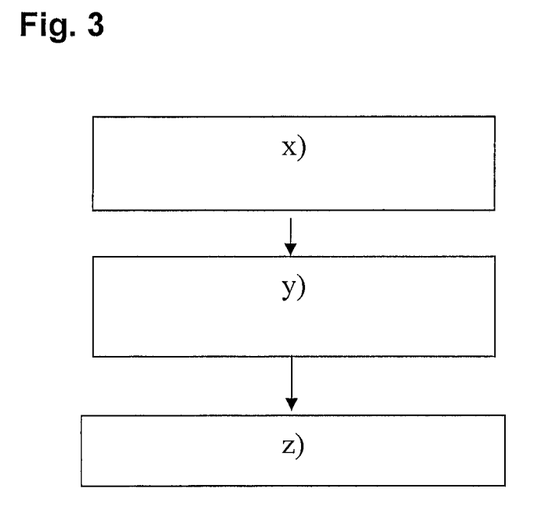
FIG. 3 shows a schematic block diagramme of the course of a method of detecting a particular process irregularity in an additively manufactured object according to an embodiment of the invention.
Figure 4:
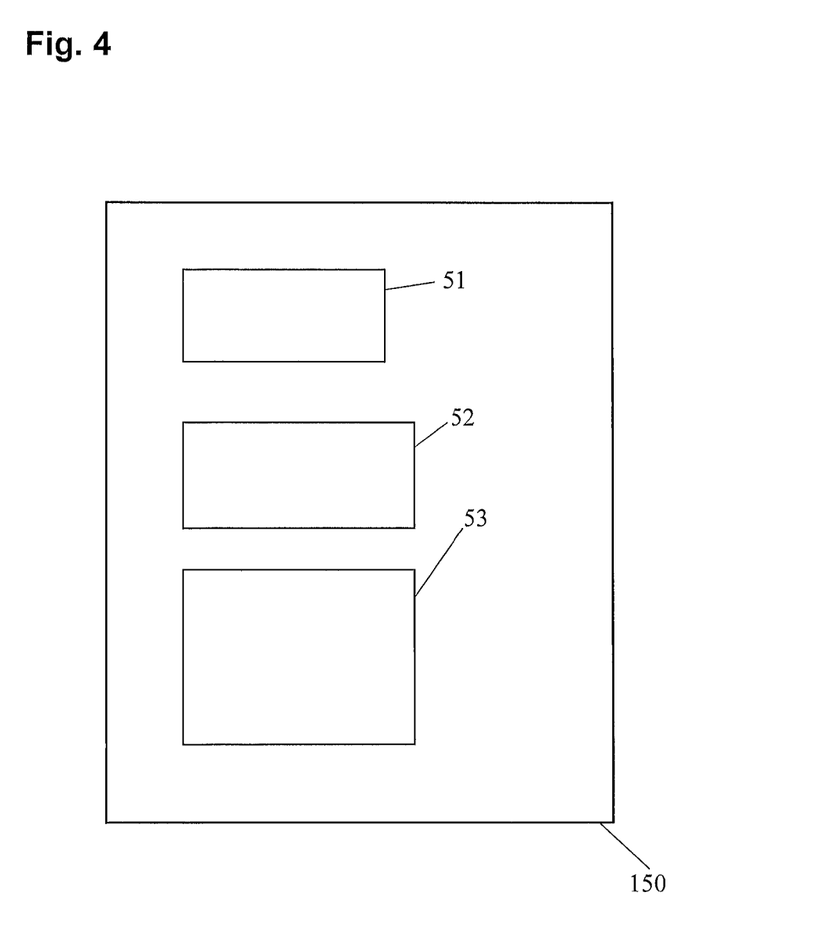
FIG. 4 shows a schematic block diagramme of a system for detecting a particular process irregularity in an additively manufactured object according to an embodiment of the invention and FIG. 5 shows for illustrative purposes a schematic CT image of an exemplary object with illustrated defects that resulted from process irregularities during the manufacture of said object.

In the next step (step y) in FIG. 3), volume image data collected in the previous step (step x) in FIG. 3) are compared to characteristic data stored e.g. in an abovementioned training data provision device. FIG. 4 shows a comparison unit 52 dedicated to comparison step y). By the comparisons similarities between volume image data and characteristic data are detected. Here, similarities will be detected e.g. by image differencing that may be used particularly for digital volume image data. Preferably, the locations at which volume image data are captured correspond to unit volumes used for generating the process irregularity data. In particular, the size and shape of a selected location in the process irregularity data should preferably be identical to the size and shape of a location to which process irregularity data refer. Nevertheless, the particular method for detecting similarities (e.g. the definition of thresholds for the difference between the volume image data that must be exceeded for a similarity to be detected) does not limit the present invention. From the detection of a similarity it results that a process irregularity assigned to the respective characteristic data occurred at the location in the object represented by the volume image data.

Finally (step z) in FIG. 3), in case in step y) similarities were detected, an information on the occurrence of particular (types of) process irregularities is output containing also an information on the respective location in the object at which the occurrence of a process irregularity was detected. FIG. 4 shows a corresponding output unit 53.

Various variations of the above-described method are possible:

As already mentioned, the present invention is not limited to a CT system. Rather, it is applicable to all kinds of detection systems that are able to produce volume image data of objects, such as e.g. ultrasound detection systems, magnetic resonance tomography systems or all other kinds of tomographic detection systems recording either electromagnetic rays or particles such as SPECT, ERT, PET, electron tomography, muon tomography or hydraulic tomography.

Furthermore, the invention is not limited to the deliberate causation of one particular process irregularity. Rather, also mixtures of process irregularities may be induced during the manufacturing of a reference object, e.g. by combining a higher laser power with a reduced powder bed temperature, etc. In particular, process irregularities that tend to occur simultaneously can be deliberately caused during the manufacturing of the reference object.

As a result of the creation of one or more look-up tables for process irregularities and their assigned characteristic volume image data for various detection systems a database can be set up, so that a user may simply access the database for interpreting the volume image data he has obtained for a particular manufactured object by a detection system he has used. Finally, during the manufacturing of a reference object one or more process monitoring systems may be used for monitoring what kind of process irregularity is actually caused. Moreover, when manufacturing actual objects, process monitoring devices used in the manufacturing process might provide further information on defects occurring in volume portions of the manufactured object. By taking into consideration information from such a monitoring device, information from the volume image data can be assisted in order to identify process irregularities that occurred during the manufacturing of the actual object.

The invention claimed is:

1. A method of detecting a particular process irregularity in an additively manufactured object, comprising the steps of:
x) acquiring volume image data of a volume of the object;
y) comparing the volume image data with a number of characteristic data each referring to a selected process irregularity, the characteristic data having been derived in a process of training a detection system that is able to acquire volume image data in an additively manufactured object for detecting process irregularities; and
z) outputting information referring to the particular process irregularity in a finding location in the object if the volume image data in the finding location match the characteristic data of that particular process irregularity,
wherein the process of training the detection system that is able to acquire volume image data in the additively manufactured object for the detection of process irregularities comprises the steps of:
a) receiving process irregularity data referring to a selected location within an additively manufactured reference object where a predefined process irregularity occurred during the additive manufacture of the object;
b) acquiring volume image data of a volume of the reference object comprising at least the selected location by the detection system;
c) identifying within the volume image data characteristic data representing a difference between the volume image data of the selected location compared to the volume image data of at least one other location of the reference object and/or of a number of other additively manufactured objects in which in at least one other location no process irregularity has occurred and/or no process irregularity is suspected; and
d) assigning to the predefined process irregularity the characteristic data as a representative of the predefined process irregularity.

2. The method according to claim 1, comprising the following steps prior to step a):
defining the selected location within the reference object prior to or during additive manufacture of the reference object;
causing the predefined process irregularity during the additive manufacture of the reference object in the selected location; and
storing the characteristic data in a memory.

3. The method according to claim 2, wherein
the predefined process irregularity is a process irregularity deliberately caused during the additive manufacture of the reference object.

4. The method according to claim 1, wherein
the predefined process irregularity is a process irregularity deliberately caused during the additive manufacture of the reference object.

5. The method according to claim 1, wherein
the predefined process irregularity is a process irregularity with essentially known irregularity factors referring to selected effects of an additive manufacturing environment on the additive manufacturing process.

6. The method according to claim 5, wherein the essentially known irregularity factors comprise at least one of:
a change of process parameters compared to those used elsewhere within the reference object during additive manufacture; and
a change of manufacturing material properties compared to that used elsewhere within the reference object during additive manufacture.

7. The method according to claim 1, wherein the volume image data in step c) are taken by a tomographic imaging system.

8. The method according to claim 1, wherein the additive manufacture comprises a powder-based manufacturing method.

9. The method of claim 1, whereby the volume image data taken in step x) are taken by essentially a same imaging method as the volume image data taken in step b).

10. A method of providing process irregularity data for a detection method according to claim 9, comprising the steps of:
defining the selected location within the reference object prior to or during additive manufacture of the reference object;
causing the predefined process irregularity during the additive manufacture of the reference object in the selected location; and
providing the process irregularity data to a memory.

11. The method of claim 9, wherein the additively manufactured object has been manufactured by a same additive manufacturing method used for manufacturing the reference object.

12. The method according to claim 11, wherein the additively manufactured object has been manufactured with a same additive manufacturing device used for manufacturing the reference object.

13. A method of providing process irregularity data for a method according to claim 1 comprising the steps of:
defining the selected location within the reference object prior to or during the additive manufacture of the reference object;
causing the predefined process irregularity during the additive manufacture of the reference object in the selected location; and
providing the process irregularity data to a memory.

14. An irregularity data provision device comprising a number of process irregularity data derived from the method according to claim 13.

15. A training data provision device comprising a number of characteristic data derived from the method according to claim 1.

16. A system for detecting a particular process irregularity in an additively manufactured object, comprising:
- x) a detection system for acquiring volume image data of a volume of the object;
- y) a comparison unit which in operation compares the volume image data with a number of characteristic data each referring to a selected process irregularity, the characteristic data having been derived in a process of training a detection system that is able to acquire volume image data in an additively manufactured object for detecting process irregularities; and
- z) an output unit for outputting an information referring to the particular process irregularity in a finding location of the object if the volume image data in that finding location match the characteristic data of that particular process irregularity, wherein the process of training the detection system that is able to acquire volume image data in the additively manufactured object for the detection of process irregularities comprises the steps of:

- a) receiving process irregularity data referring to a selected location within an additively manufactured reference object where a predefined process irregularity occurred during the additive manufacture of the object;
- b) acquiring volume image data of a volume of the reference object comprising at least the selected location by the detection system;
- c) identifying within the volume image data characteristic data representing a difference between the volume image data of the selected location compared to the volume image data of at least one other location of the reference object and/or of a number of other additively manufactured objects in which in at least one other location no process irregularity has occurred and/or no process irregularity is suspected; and
- d) assigning to the predefined process irregularity the characteristic data as a representative of the predefined process irregularity.

* * * * *